United States Patent [19]

Lee

[11] Patent Number: 4,621,608
[45] Date of Patent: * Nov. 11, 1986

[54] PORTABLE BARBECUE SYSTEM

[76] Inventor: James F. Lee, 218-12 43rd Ave., Bayside, N.Y. 11361

[ * ] Notice: The portion of the term of this patent subsequent to Jul. 2, 2002 has been disclaimed.

[21] Appl. No.: 721,081

[22] Filed: Apr. 8, 1985

Related U.S. Application Data

[63] Continuation of Ser. No. 624,144, Jun. 25, 1984, Pat. No. 4,526,158.

[51] Int. Cl.⁴ .............................................. F24C 1/16
[52] U.S. Cl. ................................. 126/9 R; 126/25 A
[58] Field of Search ...................... 126/25 R, 25 A, 29, 126/30, 9 R, 9 B

[56] References Cited

U.S. PATENT DOCUMENTS 2,959,165  11/1960  Mark .................................. 126/9 R
4,508,096   4/1985  Slattery .
4,526,158   7/1985  Lee .................................... 126/9 R Primary Examiner—Carroll B. Dority, Jr.
Attorney, Agent, or Firm—Morgan & Finnegan

[57] ABSTRACT

The present invention relates to a portable barbecue having an open-center frame provided with hingedly folding leg members and grill rack members. The leg members unfold to support the barbecue in an upright position and the grill rack members unfold to supportingly receive a cooking grill. Locking means is provided to secure the leg and grill rack members in their supporting positions. The open-center frame also supportingly engages a disposable heat reflecting drip pan and a removeable fire basket.

19 Claims, 8 Drawing Figures

PORTABLE BARBECUE SYSTEM

This application is a continuation of co-pending application Ser. No. 624,144, filed on June 25, 1984 and now U.S. Pat. No. 4,526,158.

FIELD OF INVENTION

The present invention relates to a portable barbecue grill system and, more particularly, to a new and useful structure of a portable barbecue grill which provides facile assembly and disassembly to and from the variety of cooking positions with minimal cleaning requirements.

BACKGROUND OF THE INVENTION

Various attempts have heretofore been made to provide a satisfactory portable barbecue. Early attempts include a variety of large boxes for transporting cooking grates and utensils to and from a campsite. Examples of such structures are shown in U.S. Pat. Nos. 549,056 issued to Buzzacott for COOKING OUTFIT; 1,373,828 issued to Nottingham for HEATER AND COOKER; and 1,524,961 issued to Asche for PORTABLE COOKING APPLIANCE.

Other attempts have included numerous folding cooking grates and camping stoves. Folding grills designed to stand over a ground camp fire are shown in U.S. Pat. Nos. 1,102,649 issued to Dix for COLLAPSIBLE GRATE; 1,309,049 issued to Syrett for FOLDING GRILL AND APPURTENANCES; 1,473,056 issued to Steen for CAMP GRATE; and 1,484,476 issued to Currie for CAMP GRILL.

Folding grills were subsequently improved to include a fire basket to hold heating coals and a drip pan to contain ash and grease drippings. Such structures are shown in U.S. Pat. Nos. 2,467,480 issued to Hudson for PORTABLE GRILL; and 2,597,477 issued to Haislip for COLLAPSIBLE CAMP STOVE. Both of the latter structures involve complex assembly and arrangement of many independent parts for proper storage, making these structures difficult to use. These structures all provide permanent fire boxes and drip pans which must be adequately cleaned on site prior to folding the grill for transport. These structures also have the disadvantage of having exposed surfaces when folded which become dirty and greasy during use. Therefore, not only must the fire boxes and drip pans be cleaned by hand prior to disassembly, but so must other surfaces which will be exposed during transportation and storage in the folded position.

A complex structure for broiling, baking and frying is disclosed in U.S. Pat. No. 2,221,098 issued to Langsam for PORTABLE PICNIC STOVE. That structure does not fold and requires arrangement of many interchangeable parts for use. The Langsam structure also requires that the fire box and bottom of the stove, the latter of which accumulates the fire and grease drippings, be cleaned by hand before the device is transported more than a very short distance. In any event this device, like other prior art structures, requires that the fire box and drip pan be emptied and cleaned prior to transportation.

Another portable stove structure having a folding box and grate is shown in U.S. Pat. No. 1,466,343 issued to Rouse for CAMP STOVE. The stove is only capable of baking, not frying or broiling, and since no bottom is provided this stove must be placed at ground level so that ashes and food drippings can fall to and accumulate on the ground.

The most pertinent attempt to provide a satisfactory portable grill is shown in U.S. Pat. No. 2,515,521 issued to Loffredo for CAMPER'S STOVE. That structure loosely contains legs, grill, and fire box for a portable grill within a folded box frame. The folded frame opens to reveal a grill side-by-side with a table-like work surface. Four adjustable legs are fastened to the extreme corners and the fire box is suspended from the grill. The only way to adjust the distance between the grill and the coals during use is to directly handle the hot fire box or grill. The only collection of cooking residue provided is the unsatisfactory and incomplete collection provided by the fire box itself, so this stove must be used directly over the ground. No wind shielding is provided to protect the fire, food and user during use and the fire box must be emptied and cleaned before it may be folded and reinserted into the folded grill. Even when folded, the external surfaces of this stove are likely to retain greasy cooking residue.

None of the prior structures provide a satisfactory portable barbecue which obtains a single structure which may be used (i) directly over a ground campfire, (ii) with a fire basket while allowing cooking residue and ashes to fall to the ground, or (iii) with a fire basket and a drip pan to collect cooking residue and ashes. Furthermore, no prior portable barbecue with a drip pan has been provided which does not require unpleasant cleaning of the drip pan prior to folding and transporting the barbecue. Prior structures have simply failed to provide a portable barbecue system which can be conveniently transported after use without extensive cleaning or exposed cooking residue on the external surfaces of the folded barbecue grill. Finally, prior portable barbecues do not provide a portable barbecue system which may be readily cleaned at home after being transported in an uncleaned or semi-cleaned state.

It is therefore an object of the present invention to provide a convenient portable barbecue system.

It is another object of the present invention to provide a portable barbecue which allows several alternative methods for exposing food to a heat source.

It is yet a further object of the present invention to provide a portable barbecue which may be used directly over a ground campfire, over the ground while providing its own fire source and allowing residue to fall to the ground, or independent of ground exposure providing both its own fire source and residue collector.

It is another object of the present invention to provide a portable barbecue system which may be transported after use without extensive cleaning and without unpleasant exposure to cooking residue and odors.

It is a further object of the present invention to provide a barbecue system in which the barbecue can be conveniently transported after use without exposure to unpleasant cooking residue and which allows convenient cleaning after transportation.

It is yet a further object of the present invention to provide, in a portable barbecue system, means for storing the barbecue after use so as to minimize, during and after transportation, exposure to both cooking residue and the unpleasant odors associated with a used barbecue.

It is another object of the present invention to provide, in a portable barbecue system, means for protecting the fire and cooking areas from wind exposure.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, steps and improvements herein shown and described.

SUMMARY OF THE INVENTION

In accordance with the present invention, a portable barbecue system is provided in which the portable barbecue may be used in a variety of cooking positions, may be transported after use without extensive cleaning and without exposed cooking residue, and which may be conveniently cleaned in a household dishwasher.

The portable barbecue grill in accordance with the present invention permits a variety of cooking methods. First, the cooking grill may be positioned directly over a campfire. Second, a fire basket may be disposed beneath the cooking grill while the cooking residue and ashes are allowed to drip to the ground. Third, a disposable heat reflecting drip pan is provided for positioning beneath the fire basket to reflect heat and radiant energy upward to the cooking grill and to collect cooking residue and ashes, thus allowing the portable barbecue to be used in an off-ground fashion, i.e., standing on a picnic table.

The portable barbecue system in accordance with the present invention permits convenient transportation of the barbecue without exposed surfaces bearing cooking residue. When used in any of the three cooking positions discussed above the portable barbecue does not require extensive on-site cleaning of the surfaces which collect cooking residue since such residue either falls to the ground or is collected in a disposable drip pan which is discarded as a unit, without cleaning, in a trash receptacle at the site.

In accordance with the present invention, after disposal of the used drip pan, the portable barbecue is folded and enclosed in a light-weight carrying case without further cleaning. The carrying case prevents contact with and minimizes unpleasant odors from any residue remaining on the portable barbecue during after-use transportation.

The portable barbecue in accordance with the present invention is configured to fit in a household dishwasher and is constructed to withstand the temperatures and detergent abrasions associated therewith. The interior surface of the carrying case is impermeable to cooking residue and may be cleaned with a warm, soapy sponge.

Thus, the portable barbecue system of the present invention permits convenient on-site use in several cooking modes and on-site disposal of the cooking residue without extensive cleaning. The portable barbecue is transported in the carrying case without further cleaning and without unpleasant contact with any remaining cooking residue or odors therefrom. Finally, the portable barbecue may be conveniently cleaned in a household dishwasher and the interior surface of the carrying case may be cleaned with a soapy sponge. Alternatively, the portable barbecue may be stored in the carrying case without further cleaning and without unpleasant odors from cooking residue remaining on the grill reaching the storage environment, i.e., a garage or storage closet.

In the preferred embodiment of the invention a portable barbecue with an open-centered frame is provided. Folding leg members hingedly attached to the bottom of the frame assume a folded position against the bottom of the frame and a locked position supporting the portable barbecue. Folding grill rack members hingedly attached to the top of the frame assume a folded position against the top of the frame and a locked, upright position projecting upward from the frame at substantially a right angle to the frame. The locking action for the folding legs and grill racks is provided by frictional engagement with locking balls mounted on the frame. A disposable heat reflecting drip pan loosely engages the frame to occupy the open center thereof. A removable fire basket engages the frame to overlie the disposable drip pan and a cooking grill is slidingly received by the upright grill rack members in a variety of cooking levels over the fire basket. Wind screens adapted to be received by the upright grill rack members provide wind shielding on three sides of the portable barbecue. A lightweight carrying case having an interior surface impermeable to ashes and cooking grease, such as a flexible plastic material which is resistant to scuffing and abrasion and is impermeable to liquids, grease, dirt and ash, and an exterior surface sufficiently durable to withstand the rigors of being transported, such as nylon, protects the portable barbecue prior to use and contains the barbecue after use, allowing the cooker to be transported without exposed cooking residue or unpleasant odors associated therewith. The barbecue grill is configured and dimensioned to fit conveniently within a household dishwasher for cleaning. The impermeable plastic and nylon carrying case may be cleaned with a sponge moistened with a warm water soap solution.

In use, the portable barbecue system according to the present invention allows the portable barbecue to be transported to the place of use in the protective carrying case. After the portable barbecue is removed from the case the folded legs and grill rack members are moved to and locked in their open and upright positions, respectively and the fire basket which is positioned engaging the frame during transport is removed. The cooking grill is slidingly engaged with the grill rack members. The portable barbecue, as thus assembled, may be placed directly over a ground campfire. Alternatively, the fire box may be left engaging the frame and occupying the open center thereof beneath the cooking grill, thus allowing the heat source, whether it be charcoal, wood or a gas burner element, to be placed in the fire basket. In this configuration cooking and heat source residue is accumulated on the ground. Finally, in the third alternative cooking mode the disposable drip pan is positioned engaging the frame and occupying the open center thereof directly beneath the fire basket to collect ashes and cooking residue. Optional wind screens are provided which engage the upright grill rack members and enclose three sides of the barbecue to protect the fire, cooking surface and user from wind.

After use the disposable drip pan, if used, is disposed of in a proper receptacle and any remaining ashes and extinguished coals are safely spilled from the fire box in a proper location. The empty fire box is preferably returned to its position engaging the frame, the cooking grill is slidably removed from the grill rack members and both the grill rack members and leg members are folded until positioned juxtaposed to the frame. The frame with the folded leg members and grill racks and containing the fuelbox, together with the cooking grill and wind screens is compactly positioned and sealed within the protective carrying case for neat, convenient transportation. Upon arriving at home the user may store the portable barbecue system without further cleaning and without unpleasant odor emanating from the protective carrying case. Preferably, however, the portable barbecue is removed from the protective case and conveniently washed in the household dishwasher. The protective case may be cleaned using a sponge moistened with warm, soapy water.

It will be apparent from the foregoing general description that the objects of the invention specifically enumerated herein are accomplished by the invention as here embodied.

Thus, as one advantage of the present invention cooking may be accomplished in several modes of operation with the portable barbecue. These modes of operation are, namely, (a) directly over a campfire without the fire basket or drip pan, (b) with a fire basket containing the heat source but without the drip pan, thus allowing ashes and cooking residue to accumulate on the ground, or (c) independent of ground contact with a fire basket to contain the heat source and a disposable heat reflecting drip pan below the fire basket to accumulate ashes and cooking residue while also promoting cooking by reflecting heat and radiant energy upward toward the cooking grill.

As a further advantage of the present invention, the locking balls attached to the frame provide positive frictional locking of the folding legs and grill rack members in their supporting and upright positions, respectively.

As yet a further advantage of the present invention, a portable barbecue system is provided which may be conveniently contained and transported after use in the lightweight carrying case with minimal on-site cleaning. Upon being transported home, the portable barbecue may be stored as packed without exposed cooking residue and minimal unpleasant odors therefrom. Alternatively, the portable barbecue system may easily be cleaned by placing the cooking surfaces in the household dishwasher and by wiping the carrying case with a soapy sponge.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate preferred embodiments of the product of the present invention, and together with the description serve to explain the principles of the invention, in which.

DETAILED DESCRIPTION OF THE PREFERRED EMBODIMENT

Figure 1:
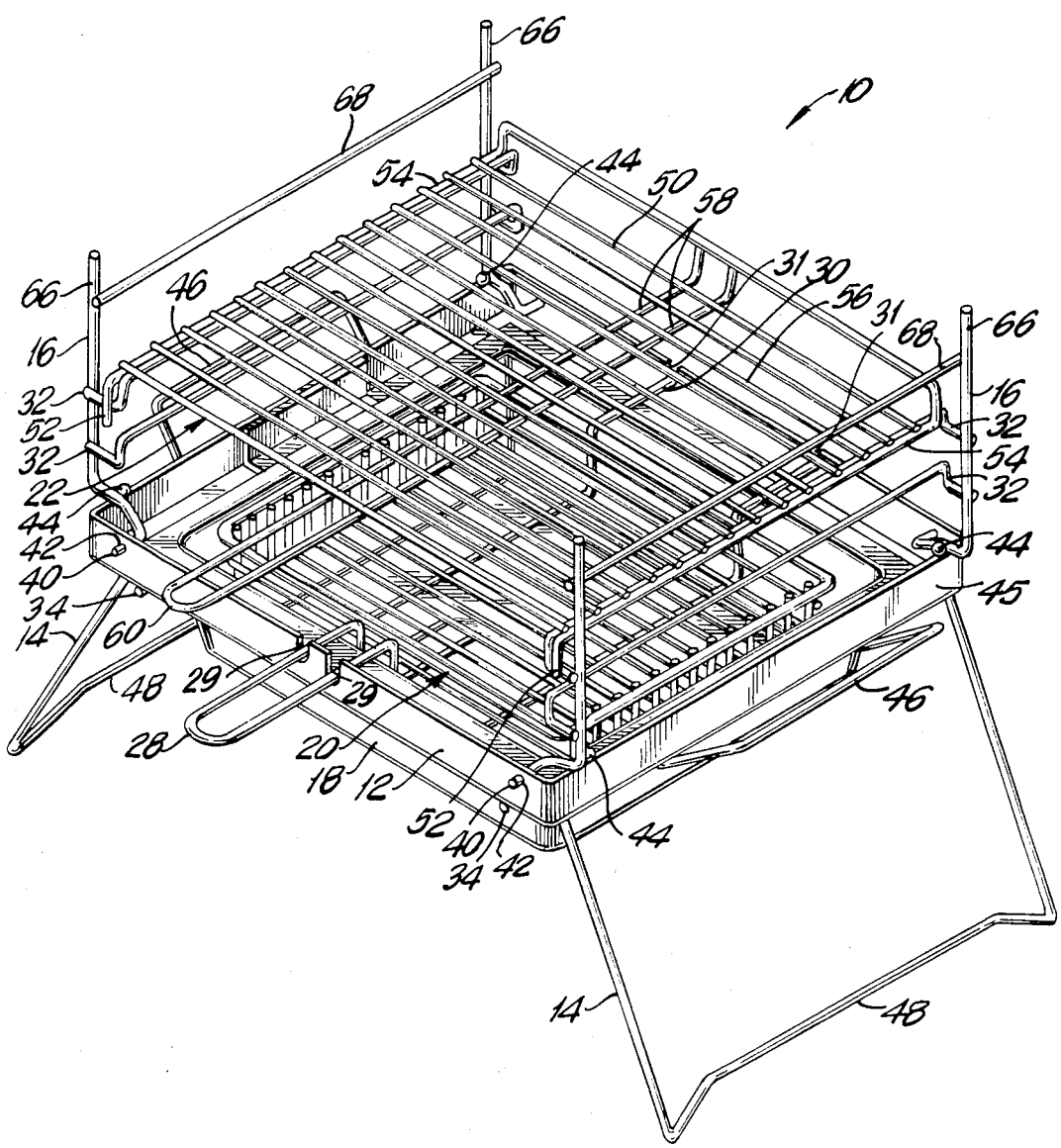
FIG. 1 is a front perspective view of the portable barbecue fully assembled with the fire basket and disposable heat reflecting drip pan in place.

Referring now more particularly to FIGS. 1–5 of the accompanying drawings, there is illustrated the preferred embodiment of a portable barbecue constructed in accordance with the present invention, indicated generally by reference numeral 10. As here embodied portable barbecue 10 includes a frame 12 having upright walls and a bottom defining an open center, folding leg members 14, and folding grill rack members 16. The leg members and grill rack members assume a folded position juxtaposed to the frame and supporting and upward positions, respectively. The folding leg and grill rack members are locked in these latter, operating positions by frictional engagement with locking balls attached to the frame. A disposable heat reflecting drip pan 18 occupies the open center of frame 12, a fire basket 20 engages the front and back walls of frame 12 and is situated above the drip pan, and a cooking grill 22 slidably engages the grill rack members to assume a variety of cooking positions over the fire basket. Wind screens 62, 70 engage the upright grill rack members to shelter the fire basket and cooking grill from wind on three sides. Portable barbecue 10 is provided with frame handles 46 to facilitate movement thereof.

Figure 4:
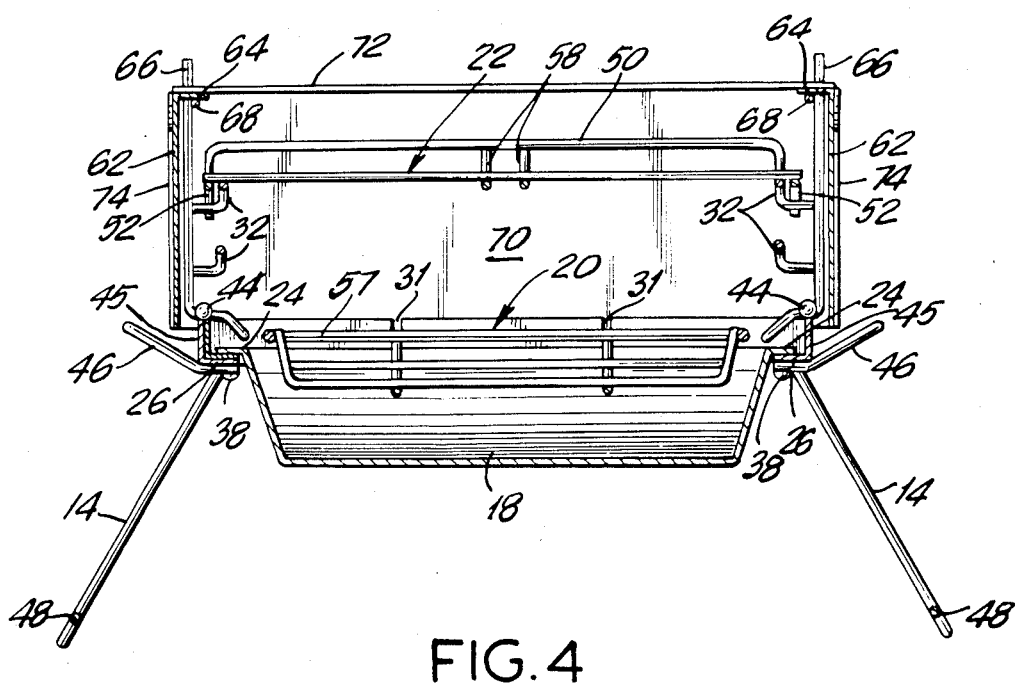
FIG. 4 is a central cross section view of the portable barbecue as shown in FIG. 2.

Disposable heat reflecting drip pan 18 is loosely held within frame 12 to occupy the open center thereof by overlapping engagement of a drip pan lip 24 with the edge of frame bottom 26 (see FIG. 4). The drip pan may thus be conveniently inserted into and removed from the frame.

Figure 2:
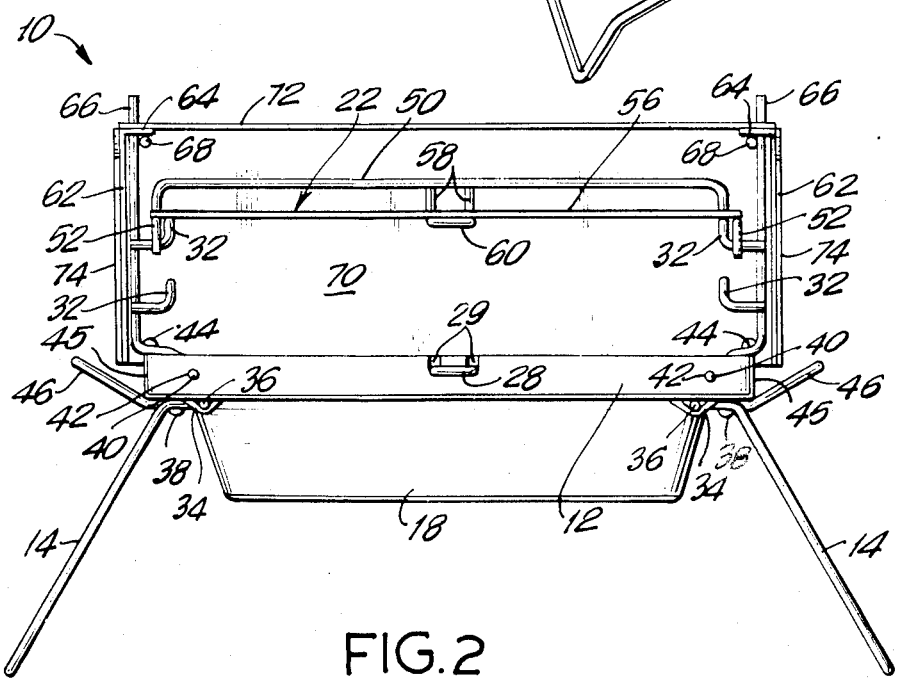
FIG. 2 is a front elevation view of the portable barbecue as shown in FIG. 1A.
Figure 3:
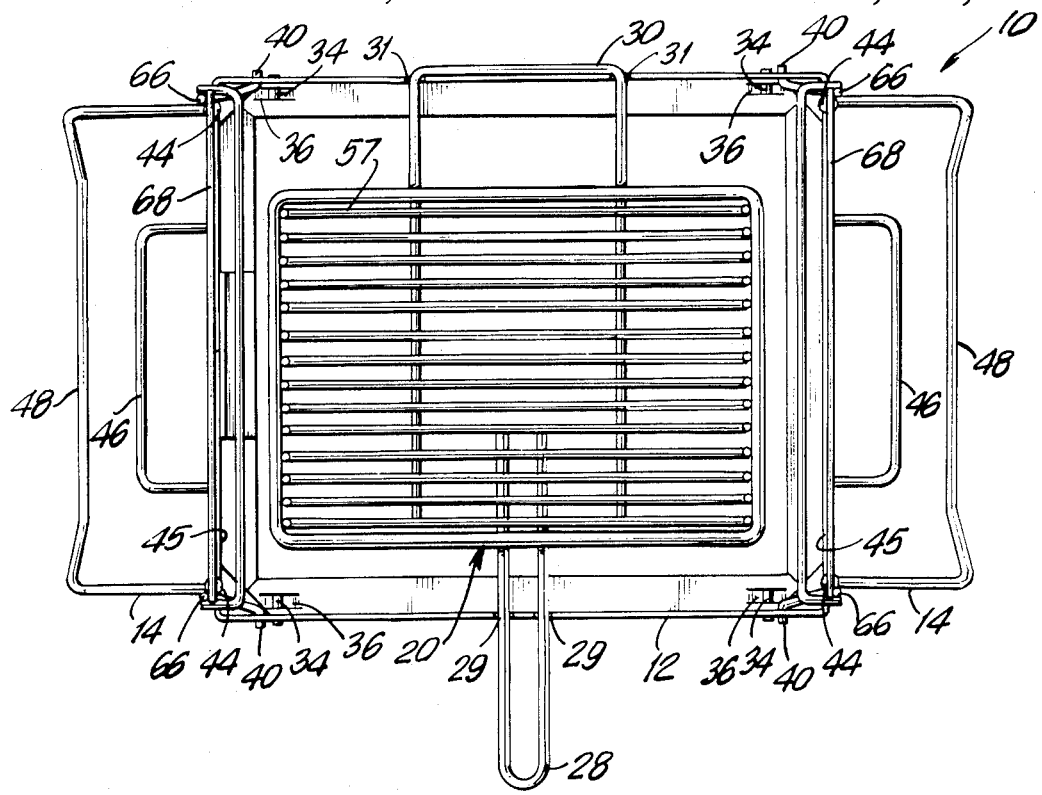
FIG. 3 is a top plan view of the portable barbecue as shown in FIG. 1 without the drip pan or cooking grill in place.

Fire basket 20 firmly engages frame 12 via fire basket handle 28 and rear fire basket support 30 as shown in FIGS. 1, 2 and 3, but may be removed from the portable barbecue by being liftingly disengaged from the frame. Both fire basket handle 28 and fire basket support 30 turn downwardly at the front and back, respectively, of the fire basket itself and resume a direction parallel to handle 28 along the bottom of the fire basket to provide support for the fire basket grill work 57 (see FIGS. 3 and 5).

Figure 5:
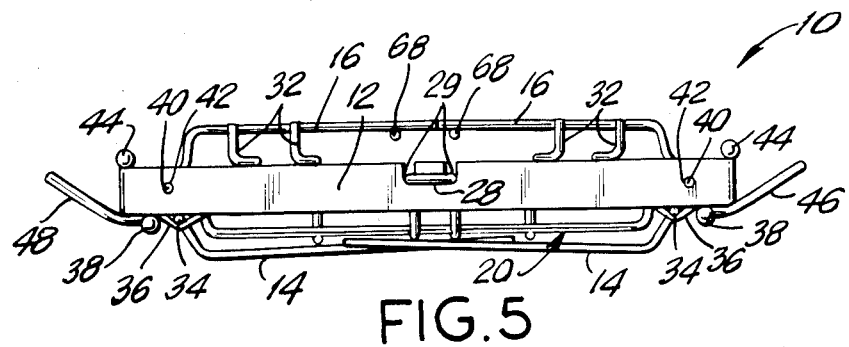
FIG. 5 is a front elevation view of the portable barbecue in the folded position with the fire basket in place and the leg and grill rack members folded against the frame.

The folding leg members 14 have leg pintles 34 which engage gudgeons 36 on the bottom of frame 12 to create a hinged relationship between the folding leg members and the frame (see FIGS. 2 and 5). Leg locking balls 38 are fixedly attached to the bottom of frame 12 to frictionally engage and hold the folding legs in the open, supporting position. Folding leg members 14 are formed with cross members 48 distal to the frame for additional sufficient support to make the portable barbecue very stable (see FIGS. 1 and 3).

Folding grill rack members 16 have grill rack pintles 40 which engage sockets 42 in the front and back walls of frame 12 to create a hinged relationship between the folding grill racks and the frame. Grill rack locking balls 44 are fixedly attached to the upper edge of the side walls of frame 12 to frictionally engage and hold the grill rack members in the upright, supporting position. The corresponding leg pintle to gudgeon and grill rack pintle to socket relationships at the front and back of frame 12 maintain each leg member and grill rack, respectively, in permanent hinged relation to the frame (see FIG. 3).

Grill supports 32 are attached to grill rack members 16 and project toward the center of frame 12 to slidably receive cooking grill 22, allowing the cooking grill to be adjusted to various cooking positions over the heat source. Cooking grill 22 is provided with a retainer 50 at the back edge thereof to prevent food from falling off that edge of the cooking surface, particluarly during adjustment of the cooking level when food is susceptible to sliding off the rear edge of the cooking grill, which is across the heat source from the user. Retainer 50 is configured such that it does not interfere with upper grill supports. Cooking grill 22 is also provided with slide stops 52 at the right and left corners of the front edge thereof to engage the front of grill supports 32 at full cooking grill insertion, thereby preventing cooking grill 22 from being overinserted. For manufacturing convenience retainer 50 and slide stops 52 may be formed integral with the side supports 54 of the cooking grill which support and maintain the spaced relationship of the grill work 56 (see FIG. 1). Additional support for the grill work and retainer is provided by central cooking grill supports 58 which are parallel to side grill supports 54 and turn upwardly at the back of the cooking grill to engage and support retainer 50. Central supports 58 protrude from the front of cooking grill 22 to form a cooking grill handle 60.

Wind screens 62, 70 are provided to shelter the cooking grill and fire basket areas from wind, thus protecting food being cooked and the user from wind blown dirt, ashes, and hot coals. The two side wind screens 62 have horizontal top flanges 64 with two holes 76 therein to engage the upper tips 66 of grill racks 16. Horizontal top flanges 64 rest on the lateral support members 68 connecting the front and back uprights of each grill rack so that side wind screens 62 assume a pre-determined position covering the sides of the barbecue. Rear wind screen 70 is similarly configured with a top horizontal flange 72 having two holes 76 therein which engage the tips 66 of each rear upright of the grill rack members. As a precautionary measure the rear wind screen should always be in place during use to provide added safety against the unlikely possibility of accidental folding of the grill racks. When used alone the rear wind screen is directly supported by lateral support members 68. When used in conjunction with side screens 62, rear wind screen 70 is indirectly supported by lateral support members 68 via the top surfaces of the horizontal flanges of the side screens. Rear wind screen 70 is also provided with forwardly projecting vertical side flanges 74 which hold side wind screens 62 against the cooker when rear wind screen 70 is placed over the side wind screens. The side and back wind screens are made of a lightweight, heat resistant material such as aluminum sheet metal and all wind screen edges are folded to eliminate sharp edges which might cause injury during handling.

Figure 6:
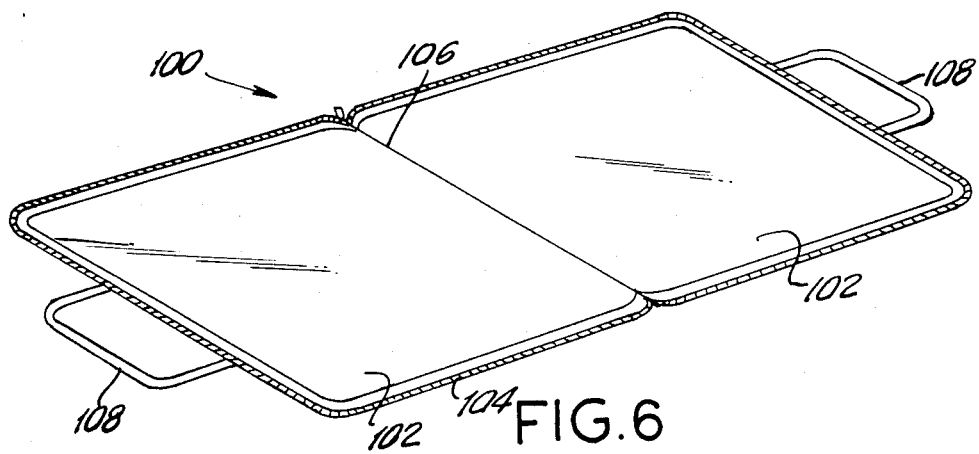
FIG. 6 is a perspective view of the lightweight carrying case which completes the portable barbecue system shown in the open position.
Figure 7:
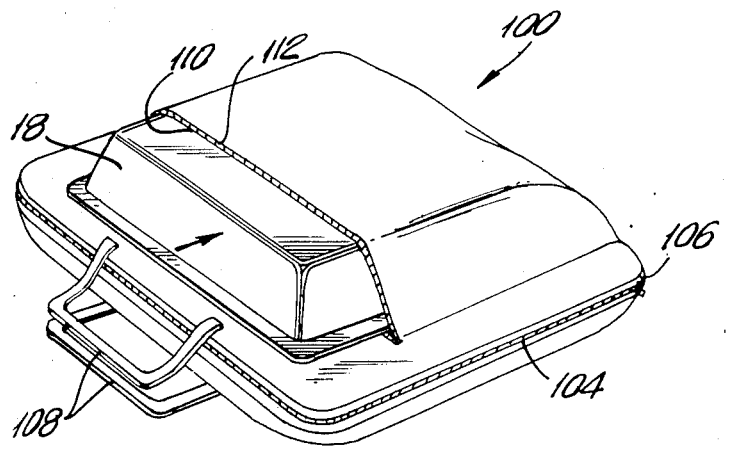
FIG. 7 is a perspective view of the lightweight carrying case of FIG. 6 shown in the closed position.

Referring to FIGS. 6 and 7, a lightweight carrying case is provided to complete the portable barbecue system. Lightweight carrying case 100 has a durable interior surface 102, such as a flexible plastic material, that is essentially impermeable to cooking grease and is resistant to abrasion and scuffing, making it appropriate for receiving the folded portable barbecue. The lightweight carrying case is also provided with a zipper 104 to close the carrying case after folding along crease 106 and handles 108 to allow convenient transportation of the closed carrying case.

In FIG. 7 the carrying case 100 is shown in its closed position. As shown, carrying case 100 is also provided with an outer pocket 110 having a zippered closure 112 which pocket is configured to hold an inverted drip pan. The outer surface of carrying case 100 is made of a material, such as nylon, which is sufficiently durable to withstand the rigors of handling and transportation which are a necessary consequence of camping and picnicing.

The lightweight carrying case receives frame 12 with the fire basket mounted in place and the leg members and grill racks in the folded position (see FIG. 5) against durable interior surface 102. The cooking grill and nested wind screens are compactly placed on top of the folded frame within the carrying case. The outer pocket receives one or more nested disposable heat reflecting drip pans in an inverted position and the hollow space underneath the inverted drip pans may be filled with packages of appropriate accessories, i.e., sterno or artificial cooking briquettes, for convenient transportation to and from the picnic site.

For ideal structural integrity and weight conservation the frame is preferably made from 0.06 inch thick stainless steel with approximately one inch high front, back and side walls and a seven-eighths of one inch wide annular bottom flange. The frame may be reinforced with triangular corner plates of the same weight steel overlying the annular bottom flange. Handles 46 are preferably formed from three-sixteenths of one inch chromed steel wire, as are the leg members, grill racks, cooking grill handle, fire basket handle, and the rear support for the fire basket. The rectangular support at the rim of the fire basket which determines the dimension of the fire basket opening, the grill side supports 54, retainer 50 and cooking grill slide stops 52 are all preferably formed of one-quarter inch chromed steel wire. All grill work members for both the fire basket and cooking grill are preferably formed from one-eighth inch chrome wire. Leg locking balls 38 are preferably three-eighths of one inch in diameter and grill rack locking balls 44 are preferably five-sixteenths of one inch in diameter, both of chromed steel. Where any of these members must be joined together the requisite bond is preferably formed by welding. The wind screens are all preferably formed from 0.02 inch thick aluminum sheet with the horizontal rims one-half inch in width having holes 76 measuring one-quarter by one-eighth of one inch to accommodate the upright tips 66 of the grill rack members 16.

To fit conveniently into a dishwasher frame 12 is typically dimensioned on the order of eleven by thirteen and one-half inches, with leg members 14 having a length of approximately seven and three-eighths inches and grill racks 16 having a length of approximately six inches. The front to back widths of the leg members and grill racks are determined by their relationship to the frame and would, in any event, be less than the eleven inch width of the frame. Cooking grill 22 is typically ten by thirteen inches with the cooking grill handle having a length of approximately five and one-half inches. The fire basket is typically seven and three-quarters by ten and three-quarters inches with a depth of one and one-half inches. Fire basket support 30 typically protrudes two and one-half inches from the back of the fire basket and fire basket handle 28 typically protrudes from the front of the fire basket by five and one-half inches. The outer dimensions of the frame given above, considered with the seven eighths of one inch width of the annular bottom flange of the frame, obtain an open center of the frame measuring approximately ten and one-eighth by twelve and five eighths inches. These dimensions are particularly appropriate for accommodating commercially available disposable aluminum pans.

Referring to FIG. 1, the portable barbecue 10 is shown in the assembled, operating position without wind screens 62, 70. The folding leg members with cross members 48 are shown in the open, supporting position and are locked in place by frictional engagement with the leg locking balls (not shown) integral with the bottom of frame 12. Disposable heat reflecting drip pan 18 is shown in place occupying the open center of frame 12. Fire basket 20 is supported over drip pan 18 by the engagement of fire basket handle 28 and a rear support (not shown) with the upright front and back walls of frame 12, respectively. Handles 46 attached to the bottom of frame 12 are provided. Grill rack members 16 are shown frictionally locked in the upright, supporting position engaging grill rack locking balls 44. The grill rack locking balls are attached to the top edges of the upright sides of frame 12. Grill rack members 16 are provided with lateral support rods 68 attached to and connecting the front and back uprights of the grill racks slightly below the tips 66 of the grill rack uprights. Grill supports 32 are integral with grill rack members 16 and slidingly receive cooking grill 22.

Cooking grill side supports 54 lie underneath and support grill work 56. The cooking grill side supports assume a position outside grill supports 32 to minimize side-to-side sliding of the cooking grill relative to grill supports 32. Integral with side supports 54 at the front of the cooking grill are slide stops 52 which are downwardly turned to engage grill supports 32 to prevent backward sliding of the cooking grill beyond the fully inserted, ready to use position shown. Retainer 50 is integral with cooking grill side supports 54 at the back of the cooking grill and is disposed above cooking grill 22 to prevent objects from falling off the back of the cooking surface. Central supports 58 are attached to the bottom of grill work 56 and turn upwardly at the back of cooking 22 to engage retainer 50 and provide additional retention of objects on the cooking surface. The central supports protrude from the front of cooking grill 22 to form a cooking grill handle 60.

Figure 1A:
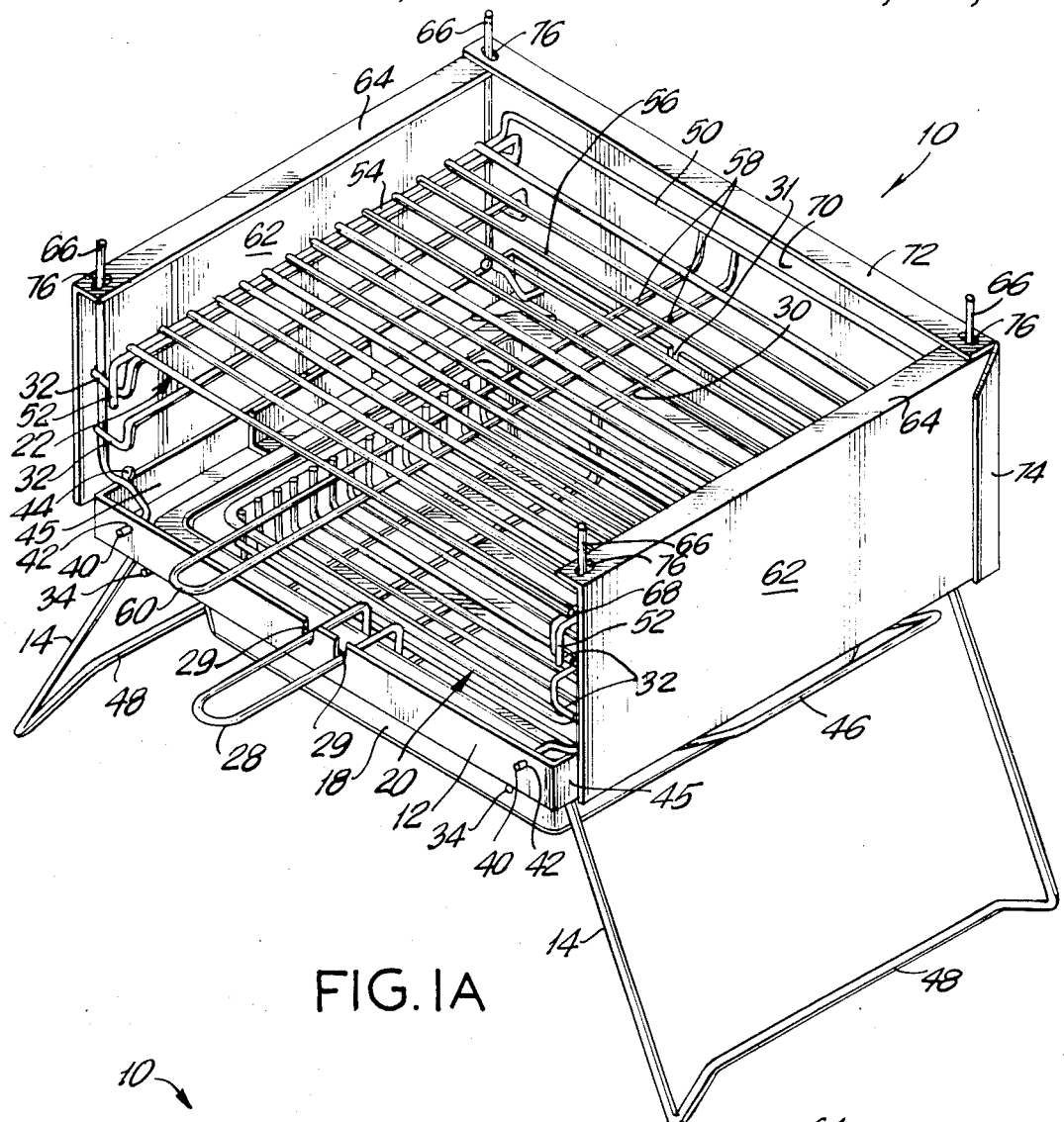
FIG. 1A is a front perspective view of the portable barbecue as shown in FIG. 1 with the side and back wind screens in place.

FIG. 1A shows the portable barbecue in accordance with FIG. 1 with wind screens 62, 70 in place. Side wind screens 62 have horizontal top flanges 64 with holes 76 to engage tips 66 of the grill rack members in the upright, supporting position. Horizontal flanges 64 rest on lateral supports 68 (see FIG. 1) and, in conjunction with the engagement of rim holes 76 and upright tips 66, position the side wind screens to cover the sides of the portable barbecue. Rear wind screen 70 is similarly provided with a horizontal top flange 72 with two holes 76 therein which are dimensioned to engage the rear upright tip of each grill rack member thereby assuming a position across the back of the portable barbecue. Rear wind screen 70 is also provided with forwardly extending vertical flanges 74 which overlap side wind screens 62 and retain the side wind screens against the barbecue.

FIG. 2 is a front elevation view of the portable cooker shown in FIG. 1A with the cooking grill engaging a lower pair of cooking grill supports 32 to obtain a lower cooking position. Folding leg members 14 are shown in the open, supporting position frictionally locked in place by engagement with leg locking balls 38 attached to the bottom of frame 12. Leg pintles 34 are positioned within gudgeons 36 to establish the hinged relationship of the legs and frame. Handles 46 are shown attached to the bottom of frame 12 behind legs 14. In occupying the open center of frame 12 disposable heat reflecting drip pan 18 extends below the frame, as shown. Fire basket handle 28 engages notches 29 in the front of frame 12 to support the fire basket over the drip pan.

Grill rack pintles 40 protrude through the front wall of frame 12 through sockets 42 to create the hinged relationship between the grill rack members and the frame. The grill rack members are held in the upright, supporting position by frictional engagement with grill rack locking balls 44 which are attached to the top of frame 12. Grill supports 32 are attached to the uprights of the grill racks and slidingly receive cooking grill 22, here shown in the lower cooking position. The cooking grill side supports (not visible) are attached to the bottom of cooking grill 22 at the ends thereof and lie outside grill supports 32 to minimize side-to-side sliding of the cooking grill. Retainer 50 is integral with the cooking grill side supports and is positioned above the back of cooking grill 22. Slide stops 52 are integral with the front of the cooking grill side supports 54 and extend downwardly to prevent the cooking grill from sliding backward further than a fully inserted cooking position. Central supports 58 turn upwardly at the back of cooking grill 22 to engage and support retainer 50. Central supports 58 also extend forwardly beyond the front of cooking grill 22 to form cooking grill handle 60. Tips 66 of the upright grill racks receive horizontal flange rims 64 and 72 of the side and back wind screens, respectively, to position the wind screens over lateral support rod 68. Vertical flanges 74 on rear wind screen 70 overlap and retains side screens 62 against grill racks 16.

FIG. 3 is a top plan view of the portable barbecue according to the invention without the drip pan, wind screens, or cooking grill in place. The open center of frame 12 with fire basket 20 supported thereover is clearly visible, as is the positional relationship between the leg members, handles and frame. Fire basket 20 is supported over the open center of frame 12 by the engagement of fire basket handle 28 and rear fire basket support 30 with notches 29 and 31 in the front and back walls, respectively, of frame 12. Rear support 30 is continuous across the outside of the back wall of frame 12 between notches 31 to prevent the fire basket from sliding forward relative to the frame. Handle 28 and support 30 turn downwardly at the front and back, respectively, of the fire basket and run along the bottom of the fire basket to provide support for and maintain the spaced relationship of fire basket grill work 57.

Folding leg members 14 with integral cross members 48 are shown in the open, supporting position. Grill racks 16 are shown upright with grill rack pintles 40 projecting through the front and back of frame 12. The pintle to gudgeon and socket relationships of the grill racks and leg members, respectively, prevent the grill racks and folding leg members from becoming disconnected from the frame. The lower extremities of the grill rack uprights frictionally engage grill rack locking balls 44 which are attached, preferably by welding, to the top edge of the frame side walls 45. Grill supports 32 and lateral support rods 68 extend between the grill rack uprights.

FIG. 4 is a central cross section view of the portable barbecue as shown in FIG. 2. This view is particularly helpful in illustrating the relationship of frame 12 to disposable heat reflecting drip pan 18, cooking grill 22 and fire basket 20. Disposable drip pan 18 is provided with a lip 34 to overlie and be supported in loose engagement with frame bottom 26. Disposable aluminum pans configured in this manner are currently available for retail purchase, so the open center of frame 12 is preferably dimensioned to receive and support such a pan. Fire basket 20 is suspended over the open center of the frame and the disposable drip pan in such a manner that wind screens 62, 70 protect the fire basket even if drip pan 18 is not used, that is, the fire basket does not extend any significant distance below the frame. Cooking grill 22 is positioned over the fire basket, here shown in the lower of two cooking position. The number of available cooking positions can be varied by providing more or fewer grill supports 32. Cooking grill side supports 54 are attached to the bottom of the spaced grill work and are positioned outwardly from the grill supports 32.

FIG. 5 is a front elevation view of the portable cooking grill in the folded position without the wind screens or cooking grill. Leg members 14 are shown disengaged from leg lock balls 38 and folded against the bottom of fire basket 20 and frame 12. Fire basket 20 remains supported within frame 12 by handle 28 and rear support 30 (not shown). Grill rack members 16 are shown disengaged from grill rack locking balls 44 and folded against the top of frame 12.

FIGS. 6 and 7 are perspective views illustrating the lightweight carrying case 100 which completes the portable barbecue system. Referring to FIG. 6, a durable interior surface material 102 which is essentially impermeable to cooking residue is provided. This durable interior surface material must be impermeable to grease and ash and must withstand abrasions resulting from contact with the metal surfaces of the portable barbecue. A zipper 104 is provided on the perimeter of the carrying case for closing the carrying case.

Referring to FIG. 7, after carrying case 100 is folded along crease 106 of FIG. 6 zipper 104 is closed to secure the carrying case in the closed position. An external pocket 110 is provided which is dimensioned to receive several nested disposable drip pans in an inverted position with respect to the main body of the carrying case. Pocket 110 is also provided with a zippered closure 112. As shown, handles 108 are provided to facilitate holding the carrying case.

In use, the portable barbecue system is carried to a picnic or camp site with the barbecue in the lightweight carrying case. The frame with the fire basket mounted in place and the legs and grill racks in the folded position as shown in FIG. 5, together with the cooking grill and nested wind shields, are carried inside the main compartment of the closed carrying case. One or more disposable heat reflecting drip pans are carried in the outer pocket of the carrying case. The open interior space within external pocket 110 underneath the inverted drip pans may be filled with other cooking accessories such as a package of sterno, charcoal or artificial briquettes.

Upon arrival at the picnic or camp site, the disposable drip pans and accessories, if any, are removed from the outer pocket and set aside. Zipper 104 (see FIGS. 6 and 7) is opened and the lightweight carrying case is unfolded into the open position shown in FIG. 6 so that the folded portable barbecue can be removed. The cooking grill and wind shields are set aside and frame 12 with fire basket 20, folded legs 14 and folded grill racks 16 positioned as shown in FIG. 5 is removed. Legs 14 are unfolded by hinged rotation of leg pintles 34 in gudgeons 36 and locked in the open, supporting position by frictional engagement with leg locking balls 38 (see FIGS. 1 and 2). Grill racks 16 are similarly unfolded by hinged rotation of grill rack pintles 40 in frame sockets 42 and locked in the upright position by frictional engagement with grill rack locking balls 44 (see FIGS. 1 and 2). The method of cooking is then chosen and one of three corresponding cooking positions is selected.

To use the portable barbecue directly over a campfire, fire basket 20 is removed and cooking grill 22 is slidingly engaged with grill supports 32. The portable barbecue may then be placed directly over the campfire such that heat reaches the cooking grill via the open center of frame 12.

To use the portable barbecue with its own heat source while allowing ashes and cooking residue to fall to the ground, fire basket 20 is left mounted in frame 12 and cooking grill 22 is slidingly engaged with grill supports 32. A fire source is placed in fire basket 20 and the portable barbecue is placed on the ground. The fire source may be wood, charcoal or an artificial source such as sterno, simulated charcoal briquettes, or a gas burner element. In this mode of operation heat for cooking comes from the fire basket and ashes and cooking residue, i.e., fats and grease, fall directly onto the ground.

To use the portable barbecue independent of ground exposure, fire basket 20 is temporarily removed from frame 12 to allow insertion of disposable heat reflecting drip pan 18 so that lip 24 of the drip pan engages the edge of frame bottom 26. Preferably, two nested drip pans are used together for added safety against the isolated possibility that a hot coal will penetrate any inherently weak point in one drip pan. With fire basket 20 replaced in frame 12 and cooking grill 22 slidingly inserted over grill supports 32, as illustrated in FIG. 1, the portable barbecue may be used in an off-ground fashion, i.e., on a picnic table. The heat source in fire basket 20 provides cooking heat to the cooking surface at the adjustable cooking grill. The disposable heat reflecting drip pan contributes to the efficiency of the portable barbecue system according to the invention by reflecting heat and radiant energy upward in the general direction of the cooking surface. The disposable drip pan collects falling ash and cooking residue for convenient disposal.

In all three of the cooking positions discussed above the wind screens can be engaged as shown in FIG. 1A. Side wind screens 62 are engaged with upright grill racks 16 by receiving tips 66 in holes 76 provided in horizontal top flanges 64. The side wind screens rest on lateral supports 68 (see FIG. 1) to assume the predetermined position protecting the sides of the portable barbecue from wind exposure. Rear wind screen 70 having horizontal top flange 72 with holes 76 to engage the rear tips 66 of each upright grill rack protects the back of the portable barbecue from wind. The rear wind screen can be attached to the portable barbecue separately or, alternatively, after side screens 64. In the latter case forwardly extending vertical flanges 74 on either end of the rear wind screen overlap the side screens to prevent the side screens from flapping outwardly, away from the barbecue. The vertical flanges also establish an essentially continuous wind screen around three sides of the portable barbecue. Even when side screens 62 are not used rear screen 70 may be engaged to provide added safety against the unlikely possibility of grill racks 16 becoming unlocked and folding during use.

After cooking, wind screens 64, 70 are removed, nested and set aside. Cooking grill 22 is also removed and set aside. Fire basket 20 is removed from frame 12 and any extinguished coals and ashes remaining therein are disposed of. Disposable heat reflecting drip pan 18 is lifted out of frame 12 and is disposed of in an on-site trash receptacle, if any, or in the user's own trash bag after assuring that any coals therein are fully extinguished.

Fire basket 20 is replaced in frame 12 and legs 14 and grill racks 16 are unlocked from frictional locking balls 38 and 44, respectively, and folded juxtaposed to frame 12 as shown in FIG. 5. Thus folded, the portable barbecue is placed against interior surface 102 of lightweight carrying case 100 with the case in the open position shown in FIG. 6. Since interior surface 102 is durable and relatively impermeable to cooking residue, the carrying case will not be punctured by any exposed edges of the folded portable barbecue or be permanently affected by any cooking residue remaining on the folded portable barbecue. The cooking grill and nested wind shields are placed over the folded portable barbecue, the lightweight carrying case is folded along crease 106 and zipper 104 is closed, obtaining the position shown in FIG. 7 containing the entire used portable barbecue in a neat fashion.

On arriving home, the user may simply choose to store the portable barbecue system in the self-contained condition in the closed lightweight carrying case. The carrying case minimizes odors emanating from the folded cooker to the storage environment and, since interior surface 102 is relatively impermeable to cooking residue, prevents any cooking residue remaining on the folded portable barbecue from reaching the storage area. These features are particularly important since cooking grease cannot reach other objects near the stored portable barbecue, which is a concern whether the cooker is stored in an apartment closet, basement, or garage. Preventing unpleasant odors from permeating the storage area is particularly important to the apartment dweller, who does not usually have basement and garage storage space away from the everyday living area.

Preferably, however, the user will decide to clean the portable barbecue system on arriving home. This admirable trait will be encouraged by the ease with which the portable barbecue system according to the present invention is cleaned. The lightweight carrying case is opened and the portable barbecue parts are removed. All parts of the portable barbecue, namely, the wind screens, cooking grill, fire basket, and frame with folding legs and grill racks, are configured and dimensioned to conveniently fit in a household dishwasher. Therefore, the portable barbecue can be removed from the carrying case and placed directly into the dishwasher. The interior surface of the carrying case is wiped clean to remove any cooking residue using a sponge moistened with warm, soapy water.

After cleaning, the portable barbecue system can be stored with the folded cooker within the interior of the lightweight carrying case and a replenished supply of disposable heat reflecting drip pans nested in the outer pocket of the carrying case.

To the extent not already indicated, it also will be understood by those of ordinary skill in the art that any one of the various specific embodiments herein described and illustrated may be further modified to incorporate features shown in other of the specific embodiments, as desired.

The invention in its broader aspects therefore is not limited to the specific embodiments herein shown and described but departures may be made therefrom within the scope of the accompanying claims without departing from the principles of the invention and without sacrificing its chief advantages.

What is claimed is:

1. A portable barbecue comprising:
    a frame with an open center having front, rear and side walls and an inwardly extending annular bottom flange;
    first and second leg members hingedly engaging said frame to assume a first, folded position juxtaposed to the bottom of said frame and a second, supporting position extending away from the bottom of said frame;
    first and second grill rack members hingedly engaging said frame to assume a first, closed position juxtaposed to the top of said frame and a second, upright position extending upwardly from the top of said frame;
    a disposable heat reflecting drip pan having an outwardly extending annular lip adapted to engage said annular bottom flange on said frame such that said drip pan assumes a working position occupying the open center of said frame when said leg members are in said second, supporting position;
    a removable fire basket engaging said frame and overlying said disposable drip pan in said working position;
    a removable cooking grill adapted to slidably mount across said first and second grill rack members; and
    leg locking means for securing said first and second leg members in said second supporting position.

2. The portable barbecue according to claim 1 further comprising grill rack locking means for securing said first and second grill rack members in said second, upright position.

3. The portable barbecue according to claim 1 wherein said leg locking means further comprise frictional ball members attached to said frame.

4. The portable barbecue according to claim 2 wherein said grill rack locking means further comprise frictional ball members attached to said frame.

5. The portable barbecue according to claim 3 wherein said frictional ball members comprise metal beads attached to said frame.

6. The portable barbecue according to claim 4 wherein said frictional ball members comprise metal beads attached to said frame.

7. The portable barbecue according to claim 1 wherein said leg members are substantially U-shaped with the open ends thereof hingedly engaging said frame.

8. The portable barbecue according to claim 7 wherein said hinged engagement of said leg members with said frame further comprises gudgeons on the bottom of said frame receiving the ends of said U-shaped leg members.

9. The portable barbecue according to claim 1 wherein said grill rack members further comprise front and back upright members with cooking grill support members extending therebetween to slidingly receive said removable cooking grill.

10. The portable barbecue according to claim 9 wherein the hinged engagement of said grill rack members with said frame further comprises grill rack pintles extending from the lower ends of said grill rack upright members to engage sockets in said front and rear frame walls.

11. The portable barbecue according to claim 1 wherein said removable fire basket is provided with a rear support extending from the rear of said fire basket to supportingly engage said rear wall of said frame and a front handle extending from the front of said fire basket to supportingly engage said front wall of said frame.

12. The portable barbecue according to claim 11 wherein said rear support engages said rear wall of said frame to prevent forward sliding movement of said fire basket relative to said frame.

13. The portable barbecue according to claim 1 wherein said disposable heat reflecting drip pan comprises a lightweight aluminum pan provided with a drip pan lip configured to engage said annular bottom flange of said frame.

14. The portable barbecue according to claim 1 further comprising wind shield means for protecting said fire basket and said cooking grill from wind.

15. The portable barbecue according to claim 14 wherein said wind shield means further comprises a first side wind screen engaging said first grill rack member, a second side wind screen engaging said second grill rack member, and a rear wind screen engaging a rear upright member of each of said first and second grill rack members, said first, second and rear screens effectively protecting said cooking grill and said fire basket on three sides from wind.

16. The portable barbecue according to claim 1 further comprising a food retainer upwardly disposed from and extending across the back of said cooking grill.

17. The portable barbecue according to claim 1 further comprising slide stop means for preventing said cooking grill from sliding backward beyond full engagement with said cooking grill support members.

18. The portable barbecue according to claim 1 wherein all parts of said portable barbecue are configured, dimensioned and constructed to conveniently fit within a household dishwasher and to withstand the hot water and detergents associated therewith.

19. The portable barbecue according to claim 1 wherein said removable cooking grill assumes a variety of cooking positions.

* * * * *